United States Patent
Harmon et al.

(10) Patent No.: US 7,296,077 B2
(45) Date of Patent: Nov. 13, 2007

(54) METHOD AND SYSTEM FOR WEB-BASED SWITCH-USER OPERATION

(75) Inventors: Benjamin B. Harmon, Santa Cruz, CA (US); Anthony S. Moran, Santa Cruz, CA (US)

(73) Assignee: International Business Machines Corporation, Armonk, NY (US)

(*) Notice: Subject to any disclaimer, the term of this patent is extended or adjusted under 35 U.S.C. 154(b) by 354 days.

(21) Appl. No.: 10/317,996

(22) Filed: Dec. 12, 2002

(65) Prior Publication Data

US 2004/0117489 A1    Jun. 17, 2004

(51) Int. Cl.
    *G06F 15/16* (2006.01)
(52) U.S. Cl. .................. 709/229; 709/217; 713/100; 726/21
(58) Field of Classification Search ........ 709/200–203, 709/217–220, 223–229; 713/100; 726/21
    See application file for complete search history.

(56) References Cited

U.S. PATENT DOCUMENTS

| | | | | |
|---|---|---|---|---|
| 5,349,674 | A | 9/1994 | Calvert et al. | 395/800 |
| 5,937,159 | A * | 8/1999 | Meyers et al. | 726/20 |
| 5,996,016 | A | 11/1999 | Thalheimer et al. | 709/227 |
| 6,178,443 | B1 | 1/2001 | Lin | 709/208 |
| 6,434,619 | B1 * | 8/2002 | Lim et al. | 709/229 |
| 6,732,181 | B2 * | 5/2004 | Lim et al. | 709/229 |

FOREIGN PATENT DOCUMENTS

JP    10-198637    7/1998

OTHER PUBLICATIONS

"Secure authentication for remote client management", *Research Disclosure*, n. 419, pp. 394, Mar. 1999.
"pagsh"—process authentication group shell, AFS Command Reference Manual, AFS Version 3.5, IBM Corporation, Apr. 1999.
Garfinkel et al., *Practical UNIX & Internet Security*, "Section 4.3 su: Changing Who You Claim to Be", Apr. 1996.

* cited by examiner

*Primary Examiner*—Moustafa Meky
(74) *Attorney, Agent, or Firm*—Hamilton & Terrile, LLP; Stephen A. Terrile

(57) ABSTRACT

A method, an apparatus, a system, and a computer program product are presented for allowing an administrative user to provide help, support, or assistance to other users within a computing environment. An administrator obtains a username of a user who requires assistance through some means. The administrator belongs to a special group of users that is allowed to invoke a switch-user function, which obtains a comprehensive version of that user's identity, e.g., security credentials, while maintaining a session. With respect to applications and systems within a computing environment, the administrator's session will have the attributes of the assumed user identity as if the administrator had logged in with that user's authentication information. The administrator then accesses resources while impersonating that user in order to assist that user or to find a problem.

21 Claims, 5 Drawing Sheets

METHOD AND SYSTEM FOR WEB-BASED SWITCH-USER OPERATION

BACKGROUND OF THE INVENTION

1. Field of the Invention

The present invention relates to an improved data processing system and, in particular, to a method and apparatus for multicomputer data transferring. Still more particularly, the present invention provides a method and apparatus for user support with system access control and computer-to-computer authentication.

2. Description of Related Art

Software applications typically offer a basic level of support through a built-in help package that provides answers to simple usage problems. These help packages have provided fundamental guidance for users of the software application when a user accesses an application's help features. For example, there is a standard help button in some window frames within Microsoft Windows® applications; in these instances, the help button provides assistance on the data/function that is contained in its window with the data itself being stored in a file. The user is then able to maneuver through this file to get useful help information.

In some cases, it is not possible to resolve a problem through a help file. When an application user encounters a complex problem, the user is often referred to a user assistance center. Typically, a help desk agent within the user's organization attempts to find a solution to the user's problem through a knowledge base containing solutions for such problems.

Applications are growing in complexity due to their increased functional capability. Enterprises generally desire to provide authorized users with secure access to Web-based applications in a user-friendly manner throughout a variety of networks, including the Internet. Hence, a help desk agent may not be able to resolve complex problems with Web-based applications even though the help desk agent has a knowledge base application for assistance.

Some user assistance centers have applications that allow a help desk agent to remotely view what occurs on a user's desktop, thereby allowing the help desk agent to directly view a problem as it occurs on a user's machine. Other applications allow a help desk agent to remotely control a user's desktop, thereby allowing the help desk agent to directly attempt to recreate a problem on a user's machine. While these solutions have some advantages, it would often be more advantageous for a help desk agent at a user assistance center or some other type of administrative user to be able to interact with a Web-based application as if the administrative user was the user who required assistance, thereby "impersonating" the user with respect to the Web-based application.

Therefore, it would be advantageous to have a method and a system in which an administrative user could assume the programmatic identity of another user in order to interact with a Web-based application without the need for knowing any authentication information other than the other user's user identifier.

SUMMARY OF THE INVENTION

A method, an apparatus, a system, and a computer program product are presented for allowing an administrative user to provide help, support, or assistance to other users within a computing environment. Initially, an administrator has established a session at a proxy server, which obtained a credential for the administrator and stored the credential in association with the administrator's session information. Through some means, an administrator obtains a username of a target user who requires assistance. The administrator belongs to a special group of users that is allowed to invoke a switch-user operation, which obtains a credential based on the identity of the target user while maintaining the administrator's session. The proxy server associates the credential of the target user with the administrator's session. With respect to applications and systems within a computing environment, the administrator's session will have the attributes of the assumed user identity as if the administrator had logged in with that user's authentication information. The administrator then accesses resources while impersonating that user.

BRIEF DESCRIPTION OF THE DRAWINGS

The novel features believed characteristic of the invention are set forth in the appended claims. The invention itself, further objectives, and advantages thereof, will be best understood by reference to the following detailed description when read in conjunction with the accompanying drawings, wherein:

DETAILED DESCRIPTION OF THE INVENTION

In general, the devices that may comprise or relate to the present invention include a wide variety of data processing technology. Therefore, as background, a typical organization of hardware and software components within a distributed data processing system is described prior to describing the present invention in more detail.

Figure 1A:
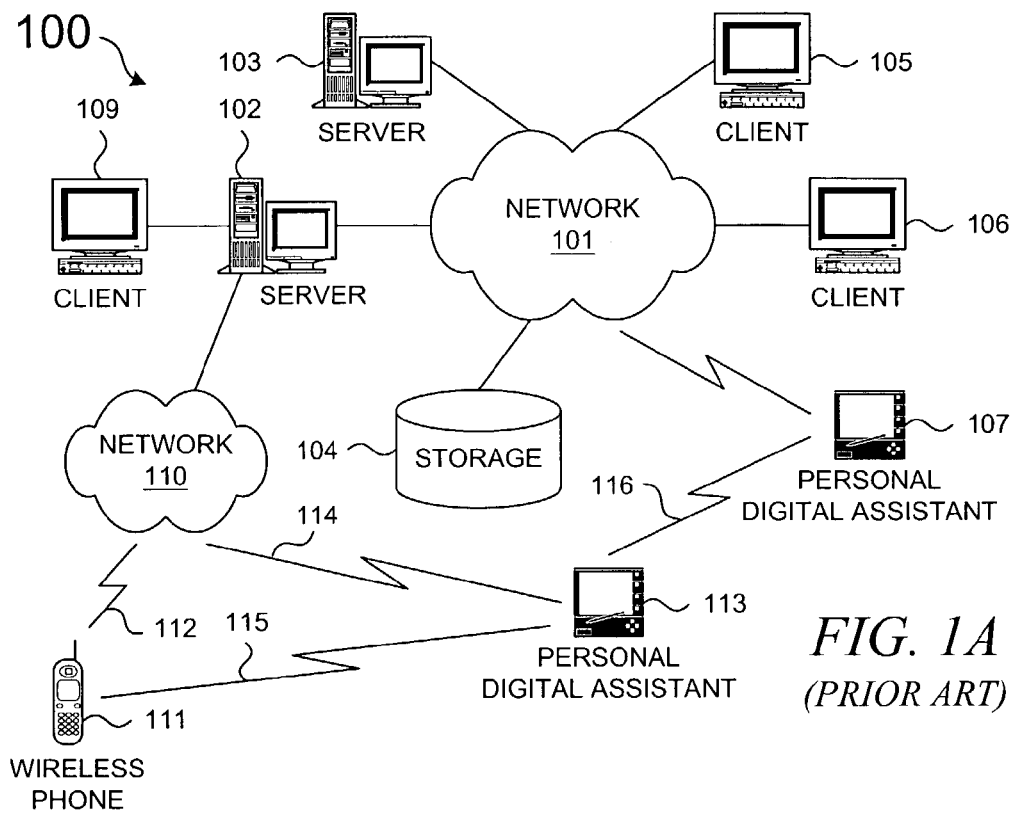
FIG. 1A depicts a typical network of data processing systems, each of which may implement the present invention.

With reference now to the figures, FIG. 1A depicts a typical network of data processing systems, each of which may implement the present invention. Distributed data processing system 100 contains network 101, which is a medium that may be used to provide communications links between various devices and computers connected together within distributed data processing system 100. Network 101 may include permanent connections, such as wire or fiber optic cables, or temporary connections made through telephone or wireless communications. In the depicted example, server 102 and server 103 are connected to network 101 along with storage unit 104. In addition, clients 105-107 also are connected to network 101. Clients 105-107 and servers 102-103 may be represented by a variety of computing devices, such as mainframes, personal computers, personal digital assistants (PDAs), etc. Distributed data processing system 100 may include additional servers, clients, routers, other devices, and peer-to-peer architectures that are not shown.

In the depicted example, distributed data processing system 100 may include the Internet with network 101 representing a worldwide collection of networks and gateways that use various protocols to communicate with one another, such as LDAP (Lightweight Directory Access Protocol), TCP/IP (Transport Control Protocol/Internet Protocol), HTTP (HyperText Transport Protocol), etc. Of course, distributed data processing system 100 may also include a number of different types of networks, such as, for example, an intranet, a local area network (LAN), or a wide area network (WAN). For example, server 102 directly supports client 109 and network 110, which incorporates wireless communication links. Network-enabled phone 111 connects to network 110 through wireless link 112, and PDA 113 connects to network 110 through wireless link 114. Phone 111 and PDA 113 can also directly transfer data between themselves across wireless link 115 using an appropriate technology, such as Bluetooth™ wireless technology, to create so-called personal area networks or personal ad-hoc networks. In a similar manner, PDA 113 can transfer data to PDA 107 via wireless communication link 116.

The present invention could be implemented on a variety of hardware platforms and software environments. FIG. 1A is intended as an example of a heterogeneous computing environment and not as an architectural limitation for the present invention.

Figure 1B:
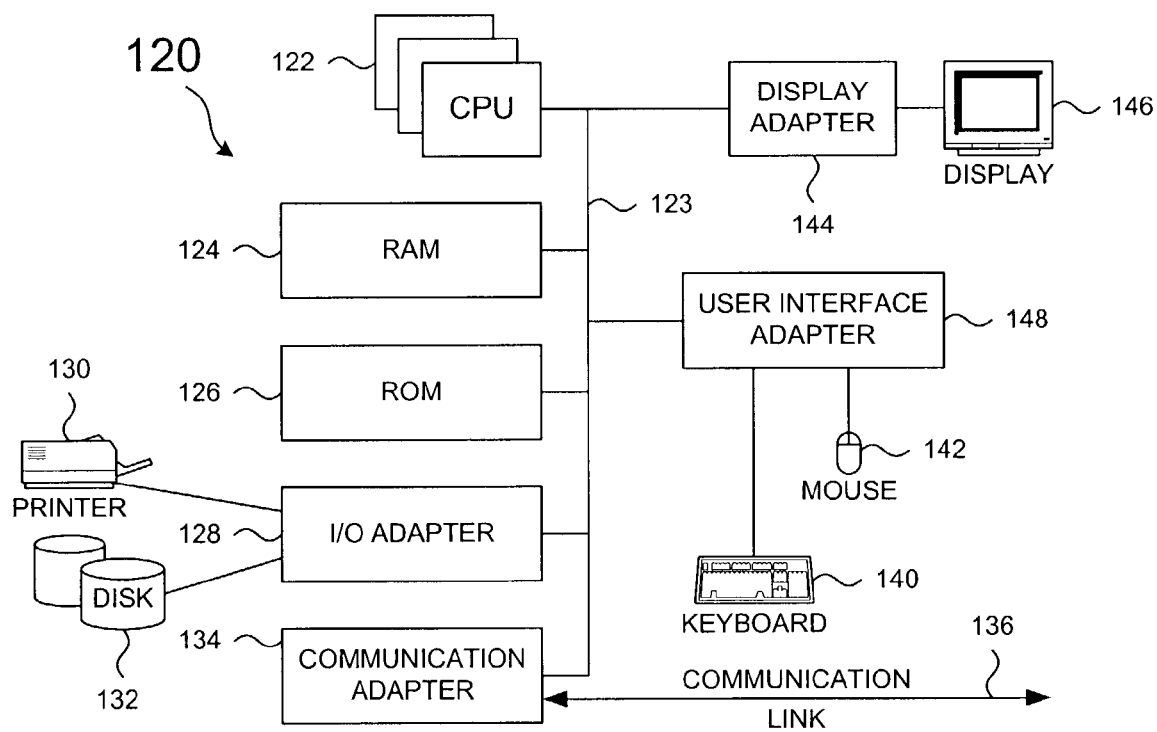
FIG. 1B depicts a typical computer architecture that may be used within a data processing system in which the present invention may be implemented.

With reference now to FIG. 1B, a diagram depicts a typical computer architecture of a data processing system, such as those shown in FIG. 1A, in which the present invention may be implemented. Data processing system 120 contains one or more central processing units (CPUs) 122 connected to internal system bus 123, which interconnects random access memory (RAM) 124, read-only memory 126, and input/output adapter 128, which supports various I/O devices, such as printer 130, disk units 132, or other devices not shown, such as a audio output system, etc. System bus 123 also connects communication adapter 134 that provides access to communication link 136. User interface adapter 148 connects various user devices, such as keyboard 140 and mouse 142, or other devices not shown, such as a touch screen, stylus, microphone, etc. Display adapter 144 connects system bus 123 to display device 146.

Those of ordinary skill in the art will appreciate that the hardware in FIG. 1B may vary depending on the system implementation. For example, the system may have one or more processors, such as an Intel® Pentium®—based processor and a digital signal processor (DSP), and one or more types of volatile and non-volatile memory. Other peripheral devices may be used in addition to or in place of the hardware depicted in FIG. 1B. The depicted examples are not meant to imply architectural limitations with respect to the present invention.

In addition to being able to be implemented on a variety of hardware platforms, the present invention may be implemented in a variety of software environments. A typical operating system may be used to control program execution within each data processing system. For example, one device may run a Unix® operating system, while another device contains a simple Java® runtime environment. A representative computer platform may include a browser, which is a well known software application for accessing hypertext documents in a variety of formats, such as graphic files, word processing files, extensible Markup Language (XML), HyperText Markup Language (HTML), Handheld Device Markup Language (HDML), Wireless Markup Language (WML), and various other formats and types of files. It should also be noted that the distributed data processing system shown in FIG. 1A is contemplated as being fully able to support a variety of peer-to-peer subnets and peer-to-peer services.

Figure 1C:
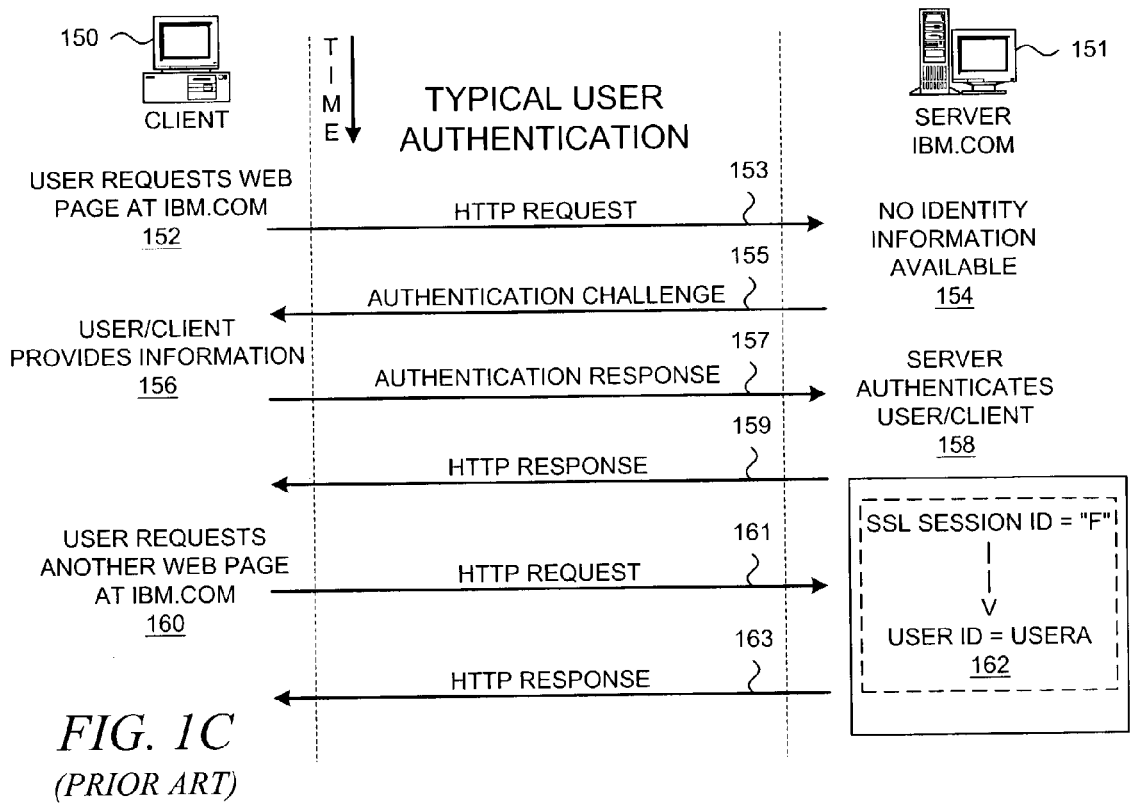
FIG. 1C depicts a data flow diagram that illustrates a typical authentication process that may be used when a client attempts to access a protected resource at a server.

With reference now to FIG. 1C, a data flow diagram illustrates a typical authentication process that may be used when a client attempts to access a protected resource at a server. As illustrated, the user at a client workstation 150 seeks access over a computer network to a protected resource on a server 151 through the user's web browser executing on the client workstation. A protected resource is a resource (an application, an object, a document, a page, a file, executable code, or other computational resource, communication-type resource, etc.) for which access is controlled or restricted. A protected resource is identified by a Uniform Resource Locator (URL), or more generally, a Uniform Resource Identifier (URI), that can only be accessed by an authenticated and authorized user. The computer network may be the Internet, an intranet, or other network, as shown in FIG. 1A or FIG. 1B, and the server may be a web application server (WAS), a server application, a servlet process, or the like.

The process is initiated when the user requests a server-side protected resource, such as a web page within the domain "ibm.com" (step 152). The terms "server-side" and "client-side" refer to actions or entities at a server or a client, respectively, within a networked environment. The web browser (or associated application or applet) generates an HTTP request that is sent to the web server that is hosting the domain "ibm.com" (step 153). The terms "request" and "response" should be understood to comprise data formatting that is appropriate for the transfer of information that is involved in a particular operation, such as messages, communication protocol information, or other associated information.

The server determines that it does not have an active session for the client (step 154), so the server requires the user to perform an authentication process by sending the client some type of authentication challenge (step 155). The authentication challenge may be in various formats, such as an HTML form. The user then provides the requested or required information (step 156), such as a user identifier and an associated password, or the client may automatically return certain information.

The authentication response information is sent to the server (step 157), at which point the server authenticates the user or client (step 158), e.g., by retrieving previously submitted registration information and matching the presented authentication information with the user's stored information. Assuming the authentication is successful, an active session is established for the authenticated user or client.

The server then retrieves the requested web page and sends an HTTP response message to the client (step 159). At that point, the user may request another page within "ibm.com" (step 160) within the browser by clicking a hypertext link, and the browser sends another HTTP request message to the server (step 161). At that point, the server recognizes that the user has an active session (step 162), and the server sends the requested web page back to the client in another HTTP response message (step 163), thereby fulfilling the user's original request for the protected resource.

The descriptions of the figures herein involve certain actions by either a client device or a user of the client device. One of ordinary skill in the art would understand that responses and/or requests to/from the client are sometimes initiated by a user and at other times are initiated automatically by a client, often on behalf of a user of the client. Hence, when a client or a user of a client is mentioned in the description of the figures, it should be understood that the terms "client" and "user" can be used interchangeably without significantly affecting the meaning of the described processes.

Figure 2A:
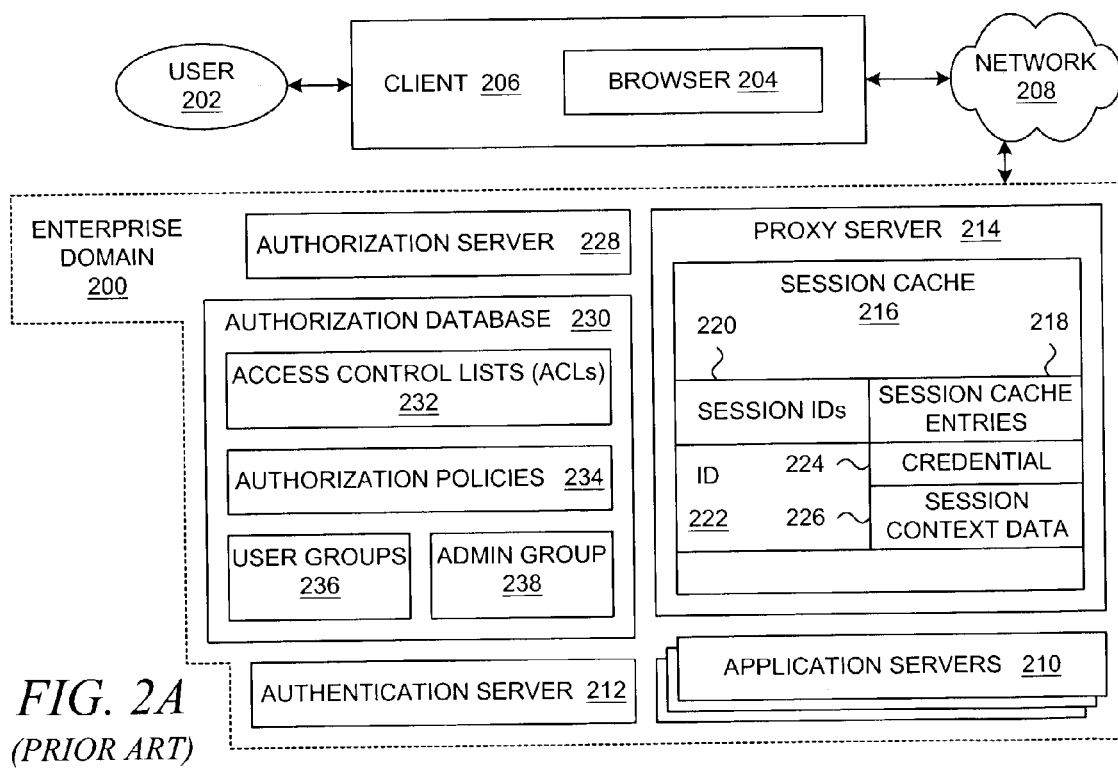
FIG. 2A depicts a block diagram that shows a typical enterprise data processing system.

With reference now to FIG. 2A, a block diagram depicts a typical enterprise data processing system. Whereas FIG. 1C depicts a typical authentication process that may be used when a client attempts to access a protected resource at a server, in contrast, FIG. 2A shows some of the server-side entities that may be used to support the authentication process that is shown in FIG. 1C and to support subsequent client requests.

As in a typical corporate computing environment or an Internet-based computing environment, enterprise domain 200 hosts controlled resources that user 202 can access, e.g., by using browser application 204 on client 206 through network 208. A protected or controlled resource is a resource (an application, an object, a document, a page, a file, executable code, or other computational resource, communication-type resource, etc.) that is only accessed or retrieved if the requesting client is both authenticated and authorized.

Enterprise domain 200 supports multiple servers. Application servers 210 support controlled and/or uncontrolled resources through web-based applications or other types of back-end applications, including legacy applications. Proxy server 214 performs a wide range of functions for enterprise domain 200, e.g., caching web pages in order to mirror the content from an application server or filtering the incoming and outgoing datastreams in order to perform various processing tasks on incoming requests and outgoing responses.

The above-noted entities within enterprise domain 200 represent typical entities within many computing environments. As was shown with respect to FIG. 1C, web-based applications typically utilize various means to prompt users to enter authentication information, often as a username/password combination within an HTML form. In the example that is shown in FIG. 2A, user 202 may be required to be authenticated before client 206 may have access to resources, after which a session is established for client 206 in a manner similar to that described above in FIG. 1C. Authentication server 212 supports various authentication mechanisms, such as username/password, X.509 certificates, or secure tokens; multiple authentication servers could be dedicated to specialized authentication methods.

After receiving an incoming request from client 206, one of the processing tasks of proxy server 214 may be to determine whether client 206 has already established a session. Proxy server 214 maintains session cache 216; for each session that is activated, proxy server 214 associates a session identifier with any information that is required to maintain the state of the session. In the example shown in FIG. 2A, session cache 216 is organized as a simple two-dimensional table containing session cache entries 218 that are searchable by session identifiers 220; for example, session ID 222 is associated with a session cache entry that contains user credential 224 and other session context data 226, such as flags for indicating various session state information.

If client 206 has not already established a session, which would be indicated by a lack of a session cache entry for client 206, an authentication service on authentication server 212 can be invoked in order to authenticate user 202. If user 202 is successfully authenticated, then a session is activated for client 206, and a session cache entry is created. The authentication service returns a credential to be used in conjunction with any subsequent processing that is performed on behalf of client 206 within enterprise domain 200; the credential is stored in the session cache entry that is associated with client 206.

If client 206 has already established a session, then additional authorization checks may be performed by proxy server 214 on an incoming request prior to granting access to a controlled resource. Before initiating an authorization operation, proxy server 214 locates the session cache entry that is associated with client 206, obtains the credential from the session cache entry, i.e. the credential that was previously associated with client 206 when user 202 was authenticated, and passes the credential and any other necessary information to authorization server 228.

Proxy server 214 is able to locate the appropriate credential for the incoming request because of a previous series of actions. When a previous web page was returned to client 206, the URLs within the web page, e.g., those that were associated with hyperlinks to controlled resources, could have been rewritten to append the session identifier for client 206. When user 202 selected a hyperlink within that web page, browser 204 would generate a request to enterprise domain 200 for the web page or other resource that is identified by the URL that is associated with the selected hyperlink. Proxy server 214 parses the URL in the incoming request to retrieve the associated session identifier.

Authorization server 228 may employ authorization database 230, which contains information such as access control lists 232, authorization policies 234, information about user groups or roles 236, and information about administrative users within a special administrative group 238. Using this information, authorization server 228 provides indications to proxy server 214 whether a specific request should be allowed to proceed, e.g., whether access to a controlled resource should be granted in response to a request from client 206. It should be noted that the present invention may be implemented in association with a variety of authentication and authorization applications, and the embodiments of the present invention that are depicted herein should not be interpreted as limiting the scope of the present invention with respect to a configuration of authentication and authorization services.

Given the description of FIGS. 1A-2A as background information, the description of the remaining figures relates to the present invention. Turning now to the present invention, the switch-user functionality of the present invention is briefly described. An administrative user desires to provide help, support, or assistance to a particular user within a computing environment. An administrative user is a user that is recognized by a system as belonging to a group of users with administrative privileges; hereinafter, an administrative user may also be called an administrator in order to distinguish an administrative user from other types of users. The user who needs assistance may have a problem or some confusion that originates due to interaction between authorization subsystems, authentication subsystems, and back-end applications.

In order to understand a potential problem, the administrator desires to impersonate the user. Through the switch-user operation of the present invention, the administrator's programmatic identity is temporarily replaced with the user's programmatic identity. The administrator then accesses resources, most likely the resources that were the cause of the problem or confusion for the user, in order to gather information or an understanding of the situation. After the administrator is finished, the administrator's own programmatic identity is restored. In this manner, the switch-user function can be viewed as allowing the administrator to impersonate another user; in this sense, the term "impersonate" relates to the manner in which a first user employs the programmatic identity of a second user such that a computer system or an application permits the first user to perform actions as if the first user were the second user.

Summarizing an embodiment of the present invention, it may be assumed that an administrator already has an established session within an enterprise domain, in which case a proxy server has a session identifier with an associated session cache entry that includes a credential for the administrator, as explained above with respect to FIG. 2A. During an invocation of the switch-user function, the administrator indicates the user whom the administrator wishes to impersonate, hereinafter termed the "target user", and a newly generated credential is obtained based on the identity of the target user. The administrator continues to use the same session identifier and the same session cache entry. However, the session cache data for the administrator will be stored aside and replaced by cache data that includes the newly obtained credential. Subsequently, the administrator's session information programmatically represents the identity of the user that the administrator has assumed, i.e. the target user, and the proxy server uses the new credential for any requests from the administrator. When the administrator completes the switch-user operation, the target user's cache data is deleted, and the administrator's saved cache data is restored.

Figure 2B:
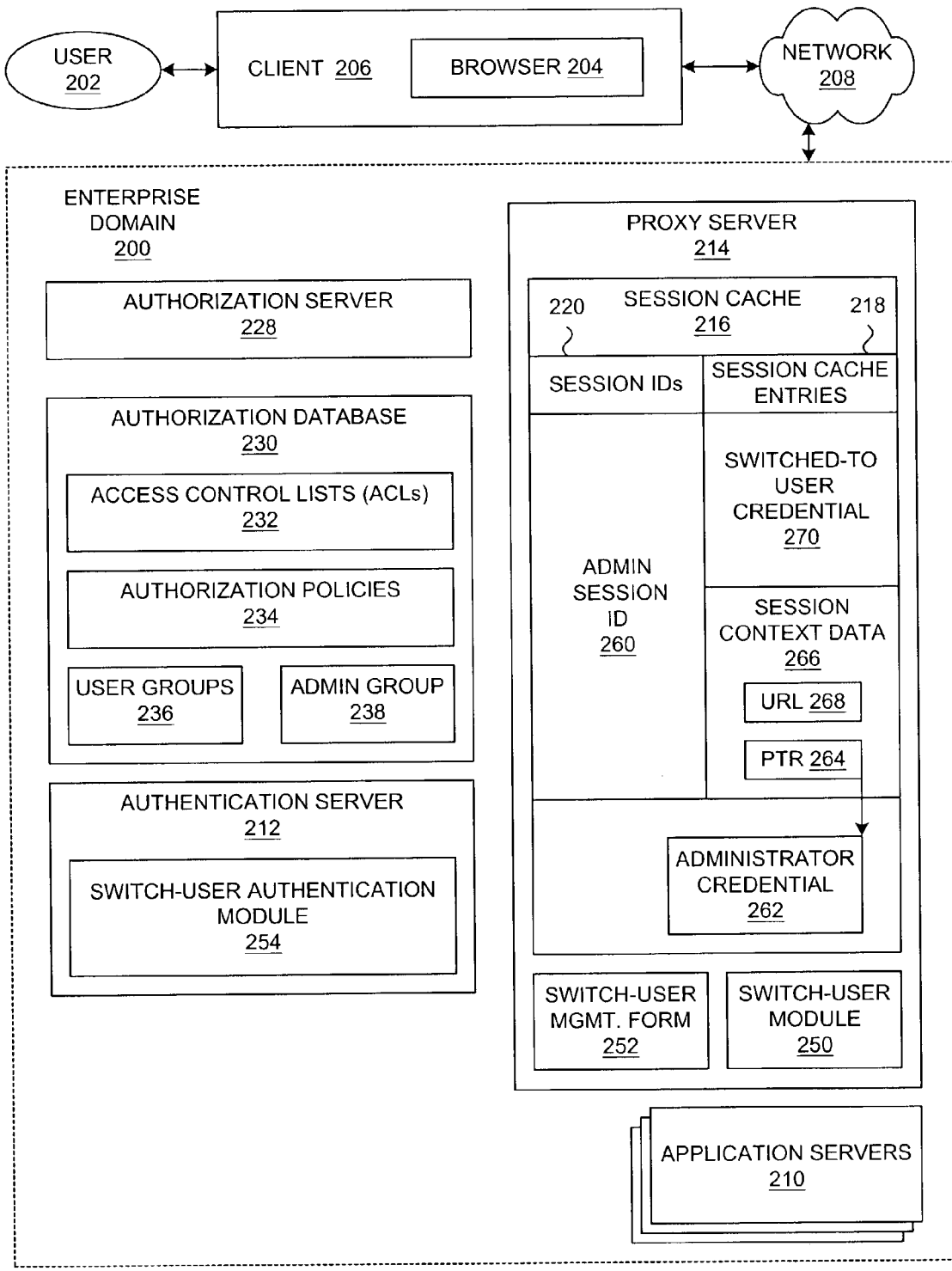
FIG. 2B depicts a block diagram that shows extended functionality within an enterprise data processing system that supports the switch-user function for an administrative user in accordance with an embodiment of the present invention.

With reference now to FIG. 2B, a block diagram depicts extended functionality within an enterprise data processing system that supports the switch-user function in accordance with an embodiment of the present invention. FIG. 2B is similar to FIG. 2A, and similar elements are designated by similar reference numerals. However, FIG. 2B depicts additional items that support the switch-user function of the present invention, the operation of which is explained in more detail further below with respect to FIGS. 3A-3B.

In particular, proxy server 214 has been extended to support the present invention by inclusion of a switch-user processing module 250. Upon verified request, switch-user processing module 250 returns special switch-user management form 252 to administrative users; the storage location of the switch-user form and the server that is responsible for it may vary with different implementations. In addition, an authentication server or an authentication service is extended to provide a special switch-user authentication function, shown in FIG. 2B as being supported by switch-user authentication module 254.

It should be noted that switch-user processing module 250 in FIG. 2B is merely an exemplary entity that assists in the functionality of the present invention. Alternative embodiments may have other configurations in which the present invention is contained within subroutines, methods, classes, procedures, etc., of different types of applications or servers. In addition, although the examples depict the use of HTTP messages and HTML pages, the present invention may be implemented to support other protocols and document formats.

FIG. 2B also shows a simplified example of a session cache after an administrator has initiated a switch-user operation. The administrator's session identifier 260 retains the same value as the administrator's original session, i.e. the administrator's session is maintained, but the session cache entry that is associated with that particular session identifier has been modified. The administrator's original credential 262 has been saved so that it may be restored after the switch-user operation has concluded. Pointer 264 to original credential 262 has been stored in modified session cache data 266 along with URL 268 of the web page at which the administrator initiated the switch-user operation. New credential 270 is stored in the session cache entry in place of the administrator's original credential; new credential 270 is a valid credential for the user for which the administrator wants to assume an identity, i.e. the target user. The manner in which the switch-user operation is initiated and maintained with these exemplary data structures is described further below in more detail with respect to FIGS. 3A-3B.

Figure 3A:
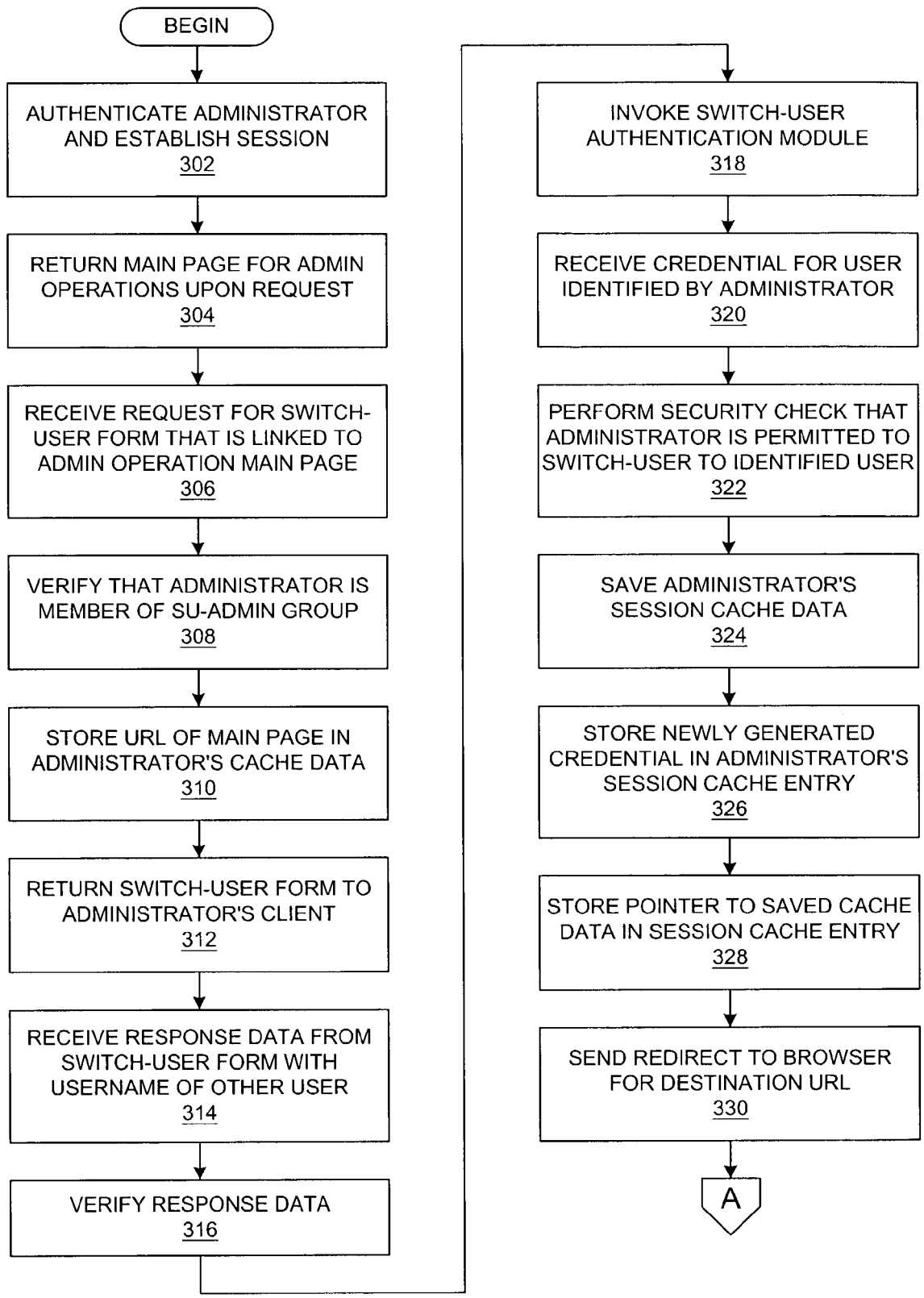
FIGS. 3A-3B depict a flowchart that shows a process for implementing the switch-user functionality of the present invention.
Figure 3B:
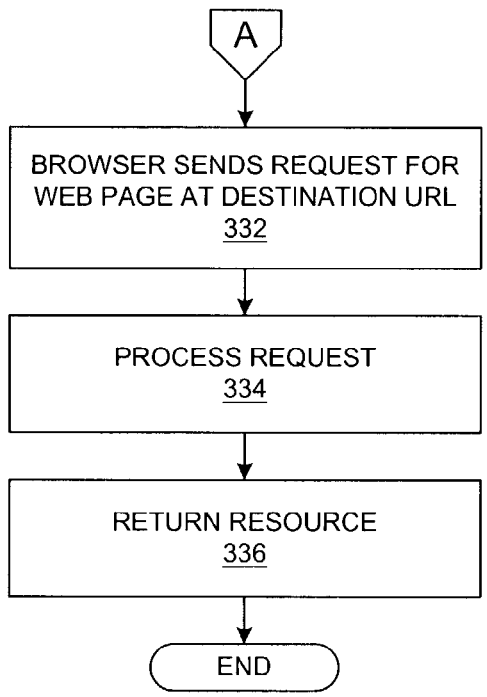

With reference now to FIGS. 3A-3B, a flowchart depicts a process for implementing the switch-user functionality of the present invention. The process begins by authenticating an administrator and establishing a session for the administrator (step 302) in a manner similar to that described above with respect to FIG. 2A. At some point in time, a web page with links to administrative operations is requested and returned to the administrator (step 304); this web page can be considered as a type of main page from which the administrator initiates various types of management functions.

The switch-user operation is initiated when the administrator selects a hyperlink within the main page to a special switch-user operation form, after which the proxy server receives a request with a URL indicating the switch-user form (step 306). The proxy server verifies that the administrator is a member of a group of users that is authorized to request the switch-user form (step 308), thereby preventing unauthorized users from initiating the switch-user function. If an unauthorized user attempts to access the switch-user form, then the user would receive some type of error response, such as a "Not Found" response. Authorized users that may access the switch-user form may comprise only a subset of all of the administrative users. Authorization may be performed with assistance from an authorization service, or for additional security, the users who belong to a special switch-user administrative group may be hard-coded into the supporting switch-user function module and not controlled by an access control list.

Assuming that the administrator has been successfully verified as a user who may obtain the switch-user form, then the URL of the main page from which the administrator requested the switch-user form is stored in the administrator's session cache data (step 310). The URL of the main page would be available because it would accompany the request for the switch-user form in the Referer header of the HTTP request message. The URL of the main page is saved so that the administrator's starting location, i.e. the main page, can be restored when the switch-user function is exited. This provides flexibility in that the switch-user form might be accessible through a variety of administrative web pages, so an administrative user who exits a switch-user operation returns to the point at which the switch-user operation was invoked; alternatively, the administrator could be forced to return to a particular web page after exiting the switch-user function.

The switch-user form is then returned to the administrator (step 312). The switch-user form contains at least a submit button and an input field for entering the username of the target user. The administrator may have obtained the username through a variety of sources, such as a help desk application through which users submit problem reports or requests for assistance. Preferably, the switch-user form also contains: some text that indicates the nature of the form; an entry field for a destination URL, i.e. a starting web page that is sent to the administrator upon successful invocation of the switch-user function; and an entry field for an authentication method. These data items may be manually entered by the administrator, but they may also be built into the form through the use of hidden fields.

The proxy server receives the form response data after the administrator completes and submits it (step 314). The response data is then verified (step 316); if there is an error, such as missing data, then the form may be returned to the administrator again with a message that indicates the nature of the error.

The receipt of a valid switch-user form causes the proxy server to initiate the switch-user functionality and to record that the administrator is participating in a switch-user operation. The proxy server invokes a special switch-user authentication module (step 318) that accepts the administrator's username, the form-supplied username of the target user, and the form-supplied authentication method. The form-supplied authentication method allows an administrator to specify a particular authentication method that should be used during the switch-user operation, thereby allowing the authentication process to be customized for switch-user operations if necessary. If the switch-user authentication module does not return a credential, then an error is returned to the administrator, in which case the administrator would continue to use the administrator's existing credential and session cache data; various error codes could be used to provide informational messages to the administrator as to the nature of the error. Assuming that the switch-user authentication is completed successfully, the proxy server receives a credential that would be valid for the target user (step 320). With the switch-user function of the present invention, the administrator is not required to obtain the target user's password or other authentication information in order to obtain the credential that would be valid for the user.

After receiving the newly generated credential, a security or authorization check is done to ensure that the administrator is permitted to perform the switch-user operation to the target user (step 322). This authorization check provides some control over the accounts on which a switch-user operation may be performed. The security check occurs at this point because the newly generated credential may be used to determine the appropriate permissions based on the group membership of the target user. For example, there may be restrictions on the abilities of administrative users to obtain credentials of other administrative users. In other embodiments, there may be specific restrictions on particular user accounts, including non-administrative user accounts, to which a switch-user operation cannot be performed. If the administrator does not have the appropriate permissions to perform the switch-user operation to the target user, then the credential would be deleted and an error would be returned to the administrator, in which case the administrator would continue to use the administrator's existing credential and session cache data.

Assuming that the administrator has the appropriate permissions to continue the switch-user operation, then the administrator's current session cache data is saved (step 324), and the newly generated credential is stored into the administrator's session cache entry (step 326). A pointer to the administrator's saved session cache data is then stored in the administrator's current session cache data (step 328) for later retrieval. The proxy server then sends a redirect to the administrator's browser for the destination URL that was received in switch-user form (step 330), and the browser follows the redirect by requesting the web page at the destination URL (step 332). The request is processed within the enterprise domain (step 334), and the requested web page and/or other information is returned to the administrator (step 336). At this point, the administrator can request and browse resources in a typical fashion, but the administrator's requests are processed in association with a credential that would be valid for the target user. Hence, the administrator is granted or denied access to resources as if the administrator was the target user, thereby effectively allowing the administrator to impersonate the target user. In addition, back-end applications can utilize attribute data in a credential, e.g., transmitted via HTTP headers to the back-end, to do application-specific logic. Having the administrator be able to have the same attributes as a user can help identify back-end application problems.

Figure 4:
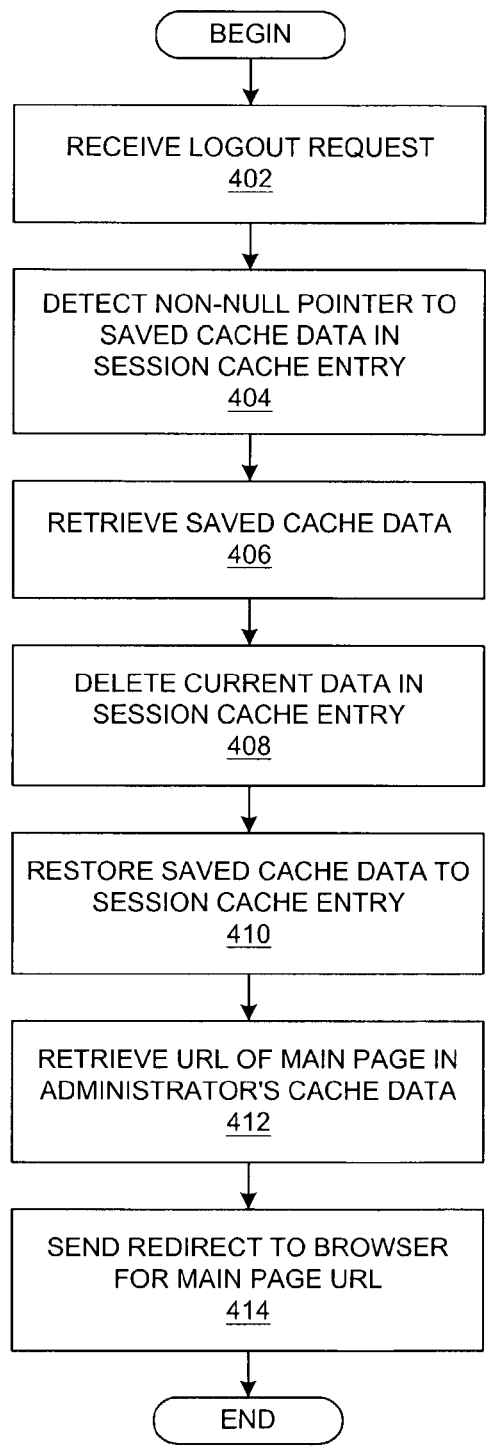
FIG. 4 depicts a flowchart that shows a process for concluding a switch-user operation.

With reference now to FIG. 4, a flowchart depicts a process for concluding a switch-user operation. At some point in time after an administrator has established a switch-user operation and has browsed resources, the administrator desires to conclude the switch-user operation. In a first embodiment, the administrator could be logged out in accordance with the credential of the target user that the administrator is using, in which case the administrator would be required to logon again and to complete an authentication process.

In a preferred embodiment, the proxy server performs a special switch-user logout operation that is more convenient for the administrator and does not require the additional logon operation. The proxy server receives a logout request from the administrator in some fashion (step 402), e.g., by sending a request for a special web page or in some other manner. The proxy server detects the request and also detects that the session cache entry for the administrator's session has a non-null pointer to saved cache data (step 404), thereby triggering the proxy server to perform the special switch-user logout operation. The pointer is used to retrieve the saved cache data (step 406), including the administrator's original credential. The current data in the session cache entry that is associated with the administrator's session identifier is deleted (step 408), and the saved cache data is restored into the session cache entry (step 410). In order to complete the switch-user operation as a full cycle of processing, the administrator's browser is returned to its originating web page by retrieving the URL of the main page that was saved in the administrator's cache data (step 412) and redirecting the browser to that URL (step 414), thereby concluding the switch-user operation.

The advantages of the present invention should be apparent in view of the detailed description of the invention that is provided above. When a user interacts with a Web-based application in a networked environment of an enterprise and needs some level of assistance with the Web-based application, it may be difficult for an administrative user within the enterprise to view, understand, or recreate any problems or confusion that the user is experiencing. In a secure environment, it can be quite difficult to debug certain permission and/or entitlement problems due to the complexity of the interaction of the authentication subsystems, authorization subsystems, and other back-end applications.

With the switch-user functionality provided by the present invention, an administrative user is able to assume the programmatic identity of a user who requires assistance, effectively allowing an administrative user to programmatically impersonate the user who requires assistance, at least with respect to the Web-based application. If the user's problem or source of confusion originates outside the enterprise's computing environment, then the administrative user should not experience the user's problem. However, if the problem or source of confusion is truly originating with the Web-based application or some other application within the enterprise domain's computing environment, then the administrative user should experience the user's problem or should be able to understand the user's source of confusion since the administrative user should have the same access to resources that the other user has.

Through the switch-user functionality, an administrative user should be able to determine and then focus on the origin of a user's problem or source of confusion, thereafter allowing the administrative user to provide appropriate assistance. While the present invention does not attempt to repair any programmatic, configuration, or other types of problems or bugs, the switch-user functionality can be employed as a tool to gather information or understanding concerning a potential problem.

It is important to note that while the present invention has been described in the context of a fully functioning data processing system, those of ordinary skill in the art will appreciate that some of the processes associated with the present invention are capable of being distributed in the form of instructions in a computer readable medium and a variety of other forms, regardless of the particular type of signal bearing media actually used to carry out the distribution. Examples of computer readable media include media such as EPROM, ROM, tape, paper, floppy disc, hard disk drive, RAM, and CD-ROMs and transmission-type media, such as digital and analog communications links.

The description of the present invention has been presented for purposes of illustration but is not intended to be exhaustive or limited to the disclosed embodiments. Many modifications and variations will be apparent to those of ordinary skill in the art. The embodiments were chosen to explain the principles of the invention and its practical applications and to enable others of ordinary skill in the art to understand the invention in order to implement various embodiments with various modifications as might be suited to other contemplated uses.

What is claimed is:

1. A method for accessing protected resources, the method comprising:
    establishing at a proxy server a session for a first user, wherein the session is associated with a credential for the first user;
    receiving at the proxy server from the first user a request to assume the identity of a second user;
    obtaining a credential for the second user;
    saving the credential of the first user; associating the credential of the second user with the session for the first user;
    receiving at the proxy server from the first user during the session for the first user a request for a protected resource; and
    providing access to the protected resource in accordance with the credential for the second user.

2. The method of claim 1 further comprising:
    prior to receiving the request to assume the identity of a second user, sending an HTML (Hypertext Markup Language) form to the first user.

3. The method of claim 2 further comprising: restricting access to the HTML form to administrative users.

4. The method of claim 2 wherein the request to assume the identity of a second user comprises a submission of data for the HTML form.

5. The method of claim 4 further comprising:
    extracting a URL (Uniform Resource Locator) from the submitted data; and
    returning a web page identified by the URL to the first user after associating the credential of the second user with the session for the first user.

6. The method of claim 1 further comprising:
    receiving a request to conclude the assumption of the identity of the second user by the first user;
    retrieving the saved credential of the first user; and
    associating the saved credential of the first user with the session for the first user.

7. The method of claim 6 further comprising:
    redirecting a browser for the first user to a web page from which the first user initiated the request to assume the identity of the second user.

8. An apparatus for accessing protected resources, the apparatus comprising:
    means for establishing at a proxy server a session for a first user, wherein the session is associated with a credential for the first user;
    means for receiving at the proxy server from the first user a request to assume the identity of a second user; means for obtaining a credential for the second user;
    means for saving the credential of the first user; means for associating the credential of the second user with the session for the first user;
    means for receiving at the proxy server from the first user during the session for the first user a request for a protected resource; and
    means for providing access to the protected resource in accordance with the credential for the second user.

9. The apparatus of claim 8 further comprising:
    means for sending, prior to receiving the request to assume the identity of a second user, an HTML (Hypertext Markup Language) form to the first user.

10. The apparatus of claim 9 further comprising:
    means for restricting access to the HTML form to administrative users.

11. The apparatus of claim 9 wherein the request to assume the identity of a second user comprises a submission of data for the HTML form.

12. The apparatus of claim 11 further comprising:
    means for extracting a URL (Uniform Resource Locator) from the submitted data; and
    means for returning a web page identified by the URL to the first user after associating the credential of the second user with the session for the first user.

13. The apparatus of claim 8 further comprising:
    means for receiving a request to conclude the assumption of the identity of the second user by the first user; means for retrieving the saved credential of the first user; and
    means for associating the saved credential of the first user with the session for the first user.

14. The apparatus of claim 13 further comprising:
means for redirecting a browser for the first user to a web page from which the first user initiated the request to assume the identity of the second user.

15. A computer program product in a computer readable medium for use in a data processing system for accessing protected resources, the computer program product comprising:
means for establishing at a proxy server a session for a first user, wherein the session is associated with a credential for the first user;
means for receiving at the proxy server from the first user a request to assume the identity of a second user; means for obtaining a credential for the second user;
means for saving the credential of the first user; means for associating the credential of the second user with the session for the first user;
means for receiving at the proxy server from the first user during the session for the first user a request for a protected resource; and
means for providing access to the protected resource in accordance with the credential for the second user.

16. The computer program product of claim 15 further comprising:
means for sending, prior to receiving the request to assume the identity of a second user, an HTML (Hypertext Markup Language) form to the first user.

17. The computer program product of claim 16 further comprising:
means for restricting access to the HTML form to administrative users.

18. The computer program product of claim 17 wherein the request to assume the identity of a second user comprises a submission of data for the HTML form.

19. The computer program product of claim 17 further comprising:
means for extracting a URL (Uniform Resource Locator) from the submitted data; and
means for returning a web page identified by the URL to the first user after associating the credential of the second user with the session for the first user.

20. The computer program product of claim 15 further comprising:
means for receiving a request to conclude the assumption of the identity of the second user by the first user;
means for retrieving the saved credential of the first user; and
means for associating the saved credential of the first user with the session for the first user.

21. The computer program product of claim 20 further comprising:
means for redirecting a browser for the first user to a web page from which the first user initiated the request to assume the identity of the second user.

* * * * *